United States Patent [19]

Van Over

[11] Patent Number: 4,543,832

[45] Date of Patent: Oct. 1, 1985

[54] OVERLOAD PROTECTED PRESSURE TRANSDUCER

[75] Inventor: William E. Van Over, Glendale, Calif.

[73] Assignee: Transducers, Inc., Cerritos, Calif.

[21] Appl. No.: 537,704

[22] Filed: Sep. 30, 1983

[51] Int. Cl.[4] ............................ G01L 7/08; G01L 9/04
[52] U.S. Cl. ........................................ 73/720; 73/706; 277/27; 277/152; 277/188 R
[58] Field of Search ............... 73/716, 717, 718, 719, 73/720, 721, 722, 706; 277/188 R, 152

[56] References Cited

U.S. PATENT DOCUMENTS 3,492,872 2/1970 Caspar et al. .......................... 73/722
3,765,256 10/1973 Schaberg ................................ 73/720

Primary Examiner—Donald O. Woodiel
Attorney, Agent, or Firm—Saul Epstein

[57] ABSTRACT

A liquid filled pressure transducer which utilizes a self activating lip seal type valve to create a sealed cavity within the transducer to prevent the flow of liquid from behind the pressure diaphragm and thereby prevent distortion of the diaphragm under overload conditions. A mechanical stop prevents excess displacement of the sensor element.

10 Claims, 4 Drawing Figures

OVERLOAD PROTECTED PRESSURE TRANSDUCER

BACKGROUND OF THE INVENTION

1. Field of the Invention

This invention relates to pressure transducers, and more particularly to pressure transducers capable of withstanding high overload pressures.

2. Description of the Prior Art

A common problem often encountered in pressure measuring systems is that the transducer may from time to time be subjected to overloads which greatly exceed the pressure measuring range of the transducer. This problem is particularly prevalent in differential pressure measurement systems where the line pressure may be a factor of hundreds or thousands times the anticipated maximum differential pressure, and overloads often occur under startup conditions. The problem also exists in many gage and absolute pressure measurement applications, but the severity is commonly greatest in high line pressure, low differential pressure systems.

Protecting the transducer against such overloads, particularly in systems where the transducer has a very low volumetric displacement, has posed a difficult problem for many years. It has been known to use a liquid filled transducer which includes valving means to limit the displacement of the transducer sensing element so as to protect it. The valve closes a fluid passageway through the transducer under overload conditions so that further displacement is prevented. Such a system for protecting a transducer against overload is disclosed in U.S. Pat. No. 3,765,256 and also in U.S. Pat. No. 3,559,488. The transducers described in the aforementioned patents utilize an "O" as the sealing element of the valving means and accordingly require a substantial displacement to assure sealing.

SUMMARY OF THE INVENTION

According to the presently preferred embodiment of the invention, the invented pressure transducer is shown as a differential pressure transducer, but it may be made for gage or absolute applications also. As illustrated, diaphragms are used as the force summing members of the transducer, however, bellows or other types of force summing members could be used.

A pair of identical diaphragms, acting in opposition on a linkage joining their centers, converts an applied differential pressure into a force which is resisted by the spring rate of the diaphragms and a displacement sensor which is also coupled to the linkage. The transducer is liquid filled so that as differential pressure is applied, liquid is displaced from the chamber or cavity behind the high side diaphragm and flows through a passageway to a chamber or cavity behind the low side diaphragm. In the preferred embodiment, the liquid passageway is formed by an annular space surrounding the linkage pin joining the diaphragm centers. A self activating lip seal attached to the high side diaphragm seals the passageway between the two diaphragms after some small predetermined displacement of the diaphragms. The pressure which causes the seal member to just contact the seat is selected as some pressure slightly over full scale. After the seal member seals the passageway, the effective stiffness of the system increases by a large factor, but the center of the diaphragm can still continue to deflect an additional small amount until a positive mechanical stop is reached. Further increase in differential pressure after the mechanical stop is reached does not result in further deflection or stress on the diaphragm. The liquid in the sealed chamber behind the high side diaphragm resists any load on the diaphragm itself, and the positive stop resists motion at the diaphragm center.

The term "self-activating lip seal" as used in this application refers to a valving mechanism for preventing fluid flow from a higher pressure region to a lower pressure region which includes a valve seat which is generally, but not necessarily, flat, and an elastomeric or other flexible seal member which has an annular lip area for sealing against the seat. The seal member is arranged so that when the annular lip is against the seat, the area of the seal parallel to the seat which is exposed to the higher pressure fluid is greater than the area exposed to the lower pressure fluid. For example, in FIG. 3, the element 20 is the elastomeric seal member with its annular lip portion being the region between tip 21 and the major diameter of core 19 (29). The pressure acting on the high pressure side of the seal acts on the annular lip area of seal 20 (between the diameter 29 and tip 21) pushing the seal toward seat 13. It can be seen that a pressure differential across the annular lip will cause the lip to flatten against the seat 13. As the lip flattens against the seat, the area exposed to the lower pressure is reduced. The greater the pressure differential, the more sealing pressure is obtained, and therefore the better the seal.

Self-activating lip seals have been used in the past to protect rotating shafts and bearings from contamination by dust and debris, but in the present invention the self-activating lip seal is used as a static face seal. The advantage in using a self-activating lip seal to seal the passageway as opposed to an "O" ring seal as has been used in the prior art is that the motion of the diaphragms can be arrested much more accurately, reliably and abruptly using such a seal. Ideally, the motion of the diaphragms should be arrested at the moment the differential pressure reaches 100% of full scale pressure, and no further motion allowed. Unfortunately, not even the present invention produces ideal performance. Some tolerance above 100% full scale pressure must be allowed before the seal comes into contact its seat, and a certain amount of compression of the seal is required to assure complete reliable sealing. With prior art seals, the total motion of the sensing element under overload conditions may be three times the motion required for full scale pressure. Using the principles disclosed herein, practical pressure transducers can be made where the total motion under overload conditions is not over 150% of full scale motion. The lower diaphragm and sensor stresses experienced because of this restricted motion results in improved hysteresis and zero instability characteristics, thereby allowing more accurate readings to be obtained.

DESCRIPTION OF THE PREFERRED EMBODIMENT

Figure 1:
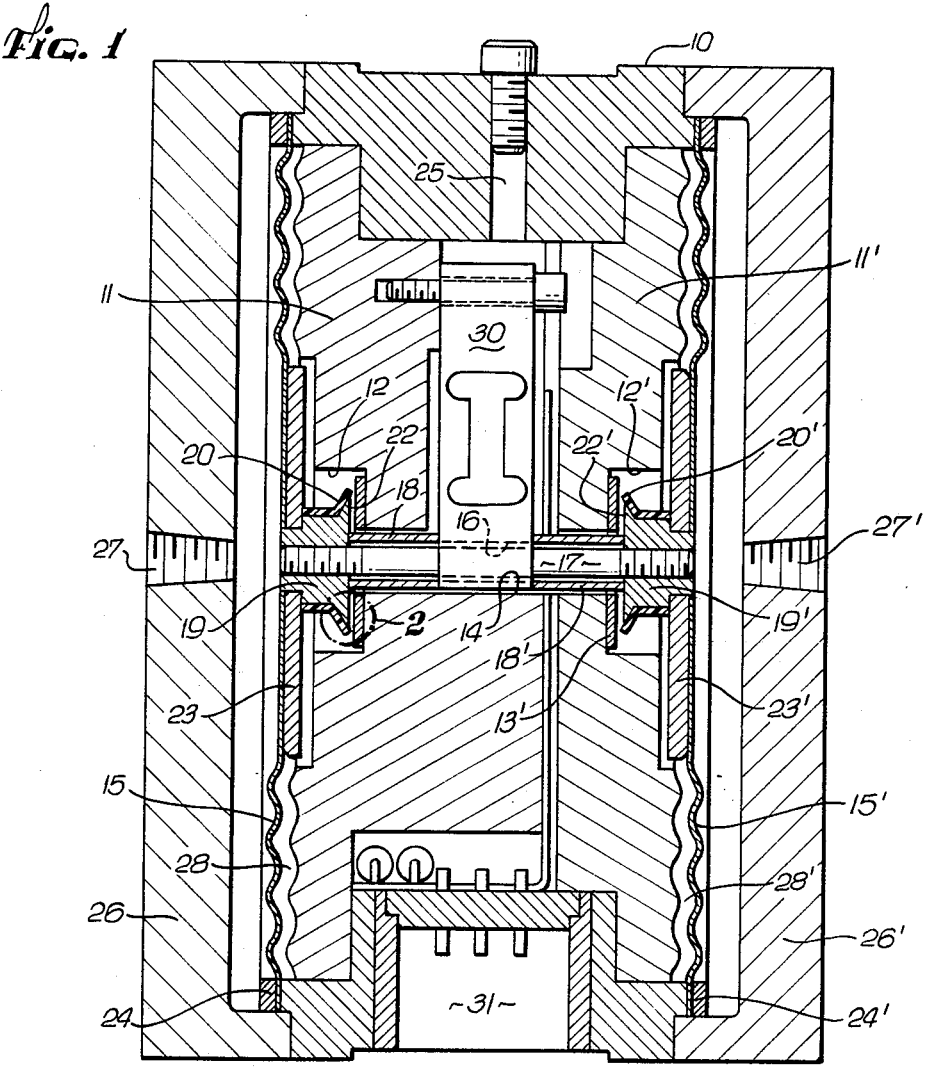
FIG. 1 is a cross sectional view through the center of the presently preferred embodiment of the invention.

FIG. 1 shows the presently preferred embodiment of the present invention as a differential pressure transducer. As shown, the pressure transducer is capable of withstanding severe differential overloads in either direction, but it will be understood that one of the two overload protecting seals may be omitted if unidirectional overloads only are expected. In addition, by venting one of the pressure ports to atmosphere, or by connecting it to a vacuum, gage or absolute pressures can be measured.

As seen in FIG. 1, a cylindrical body 10 is bored and counterbored to receive two backing plates 11 and 11' which are bonded or welded to body 10. A displacement sensor 30 is positioned within a cutout in backing plate 11 with one end of the sensor securely fastened to the backing plate. An electrical connector 31 for making the required electrical connections to sensor 30 is shown diagramatically. The sensor 30 may be of conventional design, with strain gages bonded to areas which are strained as the sensor is deflected. The strain gages are connected into an electrical circuit which provides an output which is a measure of the amount the sensor is deflected, which in turn depends upon the differential pressure applied across diaphragms 15 and 15'.

Backing plates 11 and 11' contain counterbores 12 and 12' into which flat washers 13 and 13' are bonded. These flat washers act as seats for the sealing members 20 and 20'. Backing plates 11 and 11' also have bores 14 and 14' through which a linkage pin 17 passes. Linkage pin 17 also passes through a hole 16 in the free end of sensor 30. Seal cores 19 and 19' are threaded onto the ends of linkage pin 17 clamping transducer 30 securely between spacers 18 and 18'. The linkage assembly, i.e., seal cores 19 and 19', linkage pin 17, and spacers 18 and 18', serves to rigidly couple the center portions of diaphragms 15 and 15' to each other and to sensor 30. The sealing members 20 and 20' of the self-activating lip seals are bonded or molded to rigid cores 19 and 19' with tips 21 and 21' extending slightly beyond the faces 22 and 22' of cores 19 and 19'. Tip 21' is not designated on the drawings, but it will be understood that tip 21' bears the same relationship to face 22' as tip 21 bears to face 22. Seals 20 and 20' are preferably made of a low durometer elastomer such as Buna, Nitrile, or Viton, but they may also be made of other flexible material, including metals.

Diaphragm center support plates 23 and 23' may be either bonded or welded to cores 19 and 19', and similarly, diaphragms 15 and 15' may be bonded or welded to center support plates 23 and 23'. The outer periphery of diaphragms 15 and 15' are clamped by clamping rings 24 and 24' and welded to body 10. Pressure caps 26 and 26' having pressure ports 27 and 27' may be bolted or otherwise fastened to body 10. A leak tight joint is required.

The corrugations in diaphragms 15 and 15' are preferably matched by similar corrugations in the backing plates 11 and 11'. The purpose is to reduce the internal volume of the pressure transducer as much as possible so that thermal expansion effects of the filling liquid are minimized. The transducer is filled through filling hole 25 with a suitable incompressible insulating liquid such as silicone oil. After filling, the hole is sealed with a suitable screw, or by other means.

Figure 2:
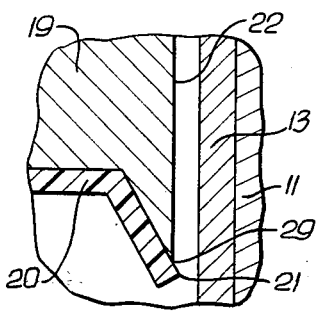
FIG. 2 is a fragmentary section of the self-activated lip seal used in the present invention, shown with no pressure applied to the pressure transducer.

FIG. 2, which is a fragmentary cross-sectional view of core 19, seal member 20, and washer 13 under zero differential pressure conditions illustrates the relative positions of the parts under these conditions. Liquid can pass freely from cavity 28 behind diaphragm 15 to cavity 28' behind diaphragm 15' and vice versa. As pressure is applied to pressure port 27, for example, the pressure on diaphragm 15 results in a force applied to sensor 30 through core 19 and spacer 18. The sensor deflects in response to the force, and the gap between tip 21 and the surface of seat 13 diminishes. As the differential pressure applied to diaphragms 15 and 15' varies, so does the force applied to sensor 30, and an electrical output is obtained which is proportional to the differential pressure.

Figure 3:
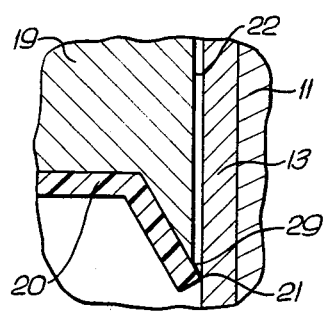
FIG. 3 is a fragmentary section of the self-activating lip seal used in the present invention shown with a modest overpressure applied to the pressure transducer whereby the lip of the seal member is just touching its seat.
Figure 4:
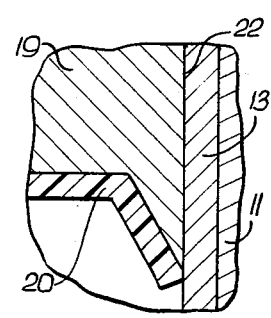
FIG. 4 is a fragmentary section of the self-activating lip seal used in the present invention shown with a high overpressure being applied to the pressure transducer.

When the differential pressure reaches some value in excess of full scale pressure, say 110% of full scale pressure, the tip 21 just touches the surface of seat 13 as illustrated in FIG. 3. At this point the cavity 28 is sealed and further pressure will cause the seal to flatten against seat 13, increasing the integrity of the seal. An increase in pressure also causes a further deflection of the linkage pin assembly until the position illustrated in FIG. 4 is reached, i.e., the surface 22 is in contact with seat 13. The seal 20 is now well-flattened against seat 13 and any further increases in pressure causes the seal to become even more effective. Since no additional force can be coupled to the sensor after surface 22 comes in contact with washer 13, and the sealing of cavity 28 prevents any additional difference in pressure across diaphragm 15, extremely large pressure overloads can be accomodated without damage to the sensor or diaphragm and without affecting the accuracy with which subsequent measurements can be made.

As noted above, "O" ring seals have been used in the past to seal chambers such as chamber 28. However, "O" rings have not been wholly satisfactory in this service since substantial compression of the "O" ring is necessary to assure an effective seal. For example, the motion reducing linkage disclosed in U.S. Pat. No. 3,765,256 was made necessary because the displacement of the sensing diaphragm between the full scale point and full overload amounted to 0.020 inches, more than could be accomodated by the sensor. See Column 3, lines 17-20. It should also be noted that in the example given, the motion of the system after full scale pressure is reached is twice the motion encountered from zero to full scale.

Using a self-activating lip seal such as disclosed herein, practical seals can be routinely made where the overload displacement is between 0.0015 and 0.003 inches. With care, effective seals can be made where the displacement after initial contact is as little as 0.0005 inch. This means that it is practical to make a pressure transducer which has a full scale displacement of 0.005 inch and a total displacement under overload conditions of only 0.008 inch. It will be realized that with such small displacements it becomes practical to directly couple a low displacement sensor to the force summing member with the consequent improvement in the time response and accuracy characteristics of the pressure transducer. The smaller displacements under overload conditions also means that zero shifts, hysteresis and other problems arising from large displacements under overload conditions are reduced.

I claim:

1. A pressure transducer which comprises:
   (a) a housing, said housing having a cavity, said cavity being liquid filled and having an opening;
   (b) a force summing member forming a portion of the wall of said cavity;
   (c) means responsive to the displacement of said force summing member for creating an electrical signal; and
   (d) a self-activating lip seal comprising an elastomeric seal member and a seat for closing said opening when a predetermined pressure is applied to said force summing member, said elastomeric seal member being coupled to said force summing member, said self activating lip seal further including support means for said elastomeric seal member for preventing buckling of said elastomeric seal member due to liquid flow occasioned by an increase in said fluid pressure when said opening is closed.

2. A pressure transducer as recited in claim 1 and further including mechanical stop means for limiting the movement of said force summing member in the direction of said seat.

3. A pressure transducer as recited in claim 1 where said self activating lip seal further includes a rigid core for supporting said elastomeric seal member coupled to said force summing member, said core having a face spaced from said seat, said elastomeric seal member surrounding said core, a portion of said seal member projecting beyond said face of said core toward said seat.

4. A pressure transducer as recited in claim 3 where said portion of said seal member projecting beyond said face of said core is substantially conical in shape whereby upon displacement of said force summing member said seal member will make line contact with said seat.

5. A pressure transducer as recited in claims 1, 2, 3, or 4 where said force summing member is a diaphragm.

6. A pressure transducer which comprises:
   (a) a body having opposed faces and a bore therethrough, said bore partially defining a passageway through said body connecting said faces;
   (b) a pair of diaphragms secured to said opposed faces whereby a cavity is formed between each diaphragm and one of said faces, said cavities and said passageway being liquid filled;
   (c) linkage means passing through said bore and coupled to the centers of said diaphragms;
   (d) means responsive to the displacement of said diaphragms for providing an electrical signal; and
   (e) a self activated lip seal including an elastomeric seal member and a seat in the first of said cavities, said self activated lip seal being operable responsive to displacement of said diaphragms for isolating said first cavity from said passageway whereby said liquid filling cannot flow from said first cavity into said passageway, said self activated seal member further including support means for said elastomeric seal member to prevent buckling of said elastomeric seal member due to fluid flow caused by motion of said diaphragms when said cavity is isolated from said passageway.

7. A pressure transducer as recited in claim 6 and further including a second self activated lip seal in the second of said cavities, said second self activated lip seal being operable responsible to displacement of said diaphragms for isolating said second cavity from said passageway whereby said liquid filling cannot flow from said second cavity to said passageway.

8. A pressure transducer as recited in claims 6 or 7 and further including mechanical stop means for limiting the movement of said, diaphragms in the direction of said seat.

9. A pressure transducer as recited in claims 6 or 7 where each said self-activating lip seal further comprises a valve seat surrounding said bore; and a rigid core for supporting said elastomeric seal member coupled to one of said diaphragms, said core having a face spaced from said valve seat; said elastomeric seal member surrounding said core, and a portion of said seal member projecting beyond said face of said core toward said seat.

10. A pressure transducer as recited in claim 9 where said portion of each said seal member projecting beyond said face of said core is substantially conical in shape whereby upon displacement of said diaphragms said seal member will make line contact with said seat.

* * * * *